(12) United States Patent
Matsufuji

(10) Patent No.: US 6,360,623 B1
(45) Date of Patent: Mar. 26, 2002

(54) TRANSMISSION SYSTEM IN WORKING VEHICLES

(75) Inventor: Mizuya Matsufuji, Sanda (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 09/518,395

(22) Filed: Mar. 3, 2000

(30) Foreign Application Priority Data

Jun. 14, 1999 (JP) ............................................ 11-166639

(51) Int. Cl.[7] .......................... F16H 37/00; F16H 57/02
(52) U.S. Cl. .................................. 74/15.66; 74/606 R
(58) Field of Search ..................... 74/15, 15.66, 15.86, 74/606 R

(56) References Cited

U.S. PATENT DOCUMENTS

| | | | | |
|---|---|---|---|---|
| 4,023,418 A | * | 5/1977 | Zenker ........................ | 74/15.86 |
| 4,074,592 A | * | 2/1978 | Stevens et al. ................ | 74/740 |
| 4,628,768 A | * | 12/1986 | Omura et al. ......... | 74/606 R X |
| 4,794,807 A | * | 1/1989 | Horii et al. ............. | 74/15.66 X |
| 5,058,455 A | | 10/1991 | Nemoto et al. ............... | 74/606 |
| 5,239,887 A | * | 8/1993 | Muller et al. .......... | 74/15.66 X |
| 5,245,892 A | * | 9/1993 | Kim et al. ............. | 74/15.66 X |
| 5,570,605 A | * | 11/1996 | Kitagawara et al. .. | 74/606 R X |
| 5,617,936 A | | 4/1997 | Nemoto .......................... | 192/4 |
| 5,901,606 A | * | 5/1999 | Umemoto et al. ......... | 74/15.66 |
| 6,003,391 A | * | 12/1999 | Kojima et al. ............. | 74/15.66 |
| 6,119,552 A | * | 9/2000 | Matsufuji ............. | 74/15.66 X |

FOREIGN PATENT DOCUMENTS

| | | | | |
|---|---|---|---|---|
| DE | 2343743 | * | 6/1975 | ................ 74/15.86 |
| JP | 59-41052 | | 10/1984 | |
| JP | 8-5383 | | 2/1996 | |

* cited by examiner

*Primary Examiner*—Sherry Estremsky
*Assistant Examiner*—Roger Pang

(57) ABSTRACT

In a front housing (1) including at a front end portion thereof an engine flywheel (6), there are provided a primary drive shaft (8) which is co-axial with the flywheel, a transmission shaft (11) which is parallel to the drive shaft, and an output shaft (13) which is co-axial with the drive shaft. The output shaft is connected to a speed change mechanism (17, 20) in a transmission case (2) succeeding to the front housing. A first supplemetary speed charge mechanism (12) is disposed between the drive shaft and the transmission shaft, and a second supplementary speed change mechanism (14) is disposed between the transmission shaft and the output shaft. One of these supplementary change mechanisms is formed into a direction-reversing mechanism, and the other change mechanism is formed into a high/low speed-selecting mechanism. Preferably, the front housing includes a first bearing support wall (1a) disposed before the first supplementary change mechanism, a second bearing support wall (4) disposed between the first and second supplementary change mechanisms, and a third bearing support wall (5) disposed behind the second supplementary change mechanism. The second and third bearing support walls are removably secured. Preferably, the second supplementary change mechanism comprises a fluid-actuated clutch (45) and a spring-actuated clutch (46) which are supplied with fluid pressure through a single fluid passage (61) in the transmission shaft.

7 Claims, 13 Drawing Sheets

TRANSMISSION SYSTEM IN WORKING VEHICLES

FIELD OF THE INVENTION

This invention relates to a transmission system in a working vehicle comprising a front housing and a transmission case which are arranged in series in a longitudinal direction of the vehicle and are fastened together. The front housing includes at its front end portion an engine flywheel, and the transmission case includes at least one speed change mechanism. In such a working vehicle, the present invention particularly relates to a transmission system in which two kinds of supplementary speed change mechanisms, which are connected in series, are provided in the front housing so as to effectively use the inside of the front housing.

BACKGROUND OF THE INVENTION

In a working vehicle comprising a front housing, including at its front end portion an engine flywheel, and a transmission case, including at least one speed change mechanism, which are arranged in series and are fastened together, it is well known from, for example, U.S. Pat. Nos. 5,058,455 and 5,617,936 that a supplementary speed change mechanism such as a direction-reversing mechanism or high/low speed-selecting mechanism is provided in the front housing. However, it has not been known yet that two kinds of such supplementary speed change mechanisms which are connected in series are provided in the front housing.

However, it would be very advantageous if such two kinds of supplementary speed change mechanisms could be provided in the front housing in a simple structure without enlarging substantially the length of the front housing. In such a case, a variety of speed change transmissions could be offered without any substantial change in the speed change mechanism in the transmission case by omitting any one of the supplementary speed change mechanisms in the front housing.

Accordingly, a primary object of the present invention is to provide a novel transmission system in which two kinds of supplementary speed change mechanisms, namely a direction-reversing mechanism and a high/low speed-selecting mechanism which are connected in series, are provided in a front housing of a working vehicle.

An attendant object of the invention is to provide a transmission system which is easy in assembly notwithstanding the provision of two kinds of supplementary speed change mechanisms.

Another attendant object is to provide a transmission system which is simple in structure and which does not lengthen the front housing.

SUMMARY OF THE INVENTION

The present invention relates to a transmission system in a working vehicle comprising a front housing (1), including at its front end portion an engine flywheel (6), and a transmission case (2), including at least one speed change mechanism (17, 20), which are arranged in series in a longitudinal direction of the vehicle and are fastened together. The transmission system according to the present invention is characterized in:

that there are provided in the front housing (1) a primary drive shaft (8) which is co-axial with the engine flywheel (6) and is adapted to be driven to rotate by the engine flywheel, a transmission shaft (11) which is arranged in parallel with the primary drive shaft, and an output shaft (13) which is co-axial with the primary drive shaft, the output shaft (13) being connected to the speed change mechanism (17, 20); and that a first two-ratio supplementary speed change mechanism (12) is disposed between the primary drive shaft (8) and the transmission shaft (11) and a second two-ratio supplementary speed change mechanism (14) is disposed between the transmission shaft (11) and the output shaft (13), one of the first and second supplementary speed change mechanism (12) being formed into a direction-reversing mechanism and the other of the first and second supplementary speed change mechanism (14) being formed into a high/low speed-selecting mechanism.

The primary drive shaft (8), provided in the front housing (1) such that it is co-axial with the engine flywheel (6), can be connected to the flywheel in a simplest manner. Because the primary drive shaft (8) and the output shaft (13) are arranged co-axially with each other, a rear end portion of the primary drive shaft and a front end portion of the output shaft can be supported by a single bearing support bore which is formed in and through a common bearing support wall. The first two-ratio supplementary speed change mechanism (12) and the second two-ratio supplementary speed change mechanism (14) are connected in series to each other by the transmission shaft (11) which is commonly employed for providing the first and second supplementary speed change mechanisms (12, 14), so that two kinds of supplementary speed change mechanisms which are connected in series are provided by employing a minimum number of the three shafts (8, 11, 13). Consequently, two kinds of the supplementary speed change mechanisms are provided in the front housing without any substantial enlargement of the housing. A variety of speed change transmissions can be offered without any substantial change in the speed change mechanism (17, 20) in the transmission case (2) by connecting between the primary drive shaft and the transmission shaft or between the transmission shaft and the output shaft through meshing gears in place of the first or second supplementary speed change mechanism.

For facilitating the assembly, it is preferred that the front housing (1) includes a first bearing support wall (1a) disposed before the first supplementary speed change mechanism (12) and a second bearing support wall (4) disposed between the first and second supplementary speed change mechanisms (12, 14), and that a third bearing support wall (5) disposed behind the second supplementary speed change mechanism (14) is provided at a location adjacent to a rear end of the front housing (1), the second bearing support wall (4) being removably secured to the front housing (1) and the third bearing support wall (5) being removably secured to the front housing (1) or to the transmission case (2). According to this structure, the first supplemetary speed change mechanism (12) can be assembled into the front housing (1) from the rear end thereof using the removable second bearing support wall (4) as a support therefor and, then, the second supplementary speed change mechanism (14) can be assembled into the front housing (1) from the rear end thereof using the removable third bearing support wall (5) as a support therefor.

The second supplementary speed change mechanism (14) can be formed into an easily operable fluid-operated type in which two clutches (45, 46) which are selectively supplied with fluid pressure for performing two-ratio speed change transmission are mounted on the transmission shaft (11). In this case, it is preferred that the transmission shaft (11) includes at least one fluid passage (61) for supplying operating fluid to the clutches (45, 46) and a lubricant passage

(69) for supplying lubricant to the clutches (45, 46), a rotary joint (65) for connecting the fluid passage (61) to a stationary fluid passage (67) being formed within the second bearing support wall (4) and another rotary joint (70) for connecting the lubricant passage (69) to a stationary lubricant passage (73) being formed within the first bearing support wall (1a). According to this structure, the rotary joint (65) for the fluid passage in the transmission shaft and the rotary joint (70) for the lubricant passage in the transmission shaft are formed at locations spaced from each other in a longitudinal direction of the transmission shaft so that the thickness of each of the first and second bearing support walls (1a, 4) can be made as small as possible, whereby enlargement of the length of the front housing (1) can be avoided.

More preferably, one of the clutches (45) is formed into a fluid-actuated frictional clutch having a first set of frictional elements (47, 48), a first piston (49) for engaging between the first set of frictional elements under the action of fluid pressure, and a return spring (50) for biasing the first piston to move away from the first set of frictional elements so as to disengage between the first set of frictional elements, whereas the other of the clutches (46) is formed into a spring-actuated frictional clutch having a second set of frictional elements (52, 53), a spring (56) for engaging between the second set of frictional elements, and a second piston (59) for disactuating the spring under the action of fluid pressure so as to disengage between the second set of frictional elements, said at least one fluid passage (61) in the transmission shaft (11) being composed of a single fluid passage through which fluid pressure is selectively supplied to and drained from the first and second pistons (49, 59) for performing the speed change transmission by the second supplementary speed change mechanism (14). According to this structure, when a trouble is caused in the fluid supply system for the second supplementary speed change mechanism the spring-actuated frictional clutch (46) will be automatically engaged due to the loss of fluid pressure applied to the second piston (59). Consequently, the vehicle drive line is not cut off at the second supplementary speed change mechanism, so that an engine brake action can be achieved. Because the fluid passage in the transmission shaft is a single one (61) and the single rotary joint (65) for such a single passage is satisfactory, the fluid passage structure for the second supplementary speed change mechanism is very simple. The length of the transmission shaft (11) can be small so that enlargement of the length of the front housing is avoided, too.

For simplifying the structure of the second supplementary speed change mechanism, it is preferred that a clutch cylinder (44) having a partition (44a) at an axially middle portion thereof is fixedly mounted on the transmission shaft (11), that the one clutch (45) is disposed within one axial half of the clutch cylinder (44) with the first piston (49) being disposed at a location adjacent to the partition (44a), and that the other clutch (46) is disposed within the other axial half of the clutch cylinder (44) with the second set of frictional elements (52, 53) being disposed at a location adjacent to the partition (44a), the spring (56) being disposed such that it acts upon the second set of frictional elements through a push disk (54) which is slidably but non-rotatably supported by the clutch cylinder, the clutch cylinder (44) having art integral cylinder portion (58) at an outer circumference of the partition (44a) for receiving the second piston (59) such that the second piston abuts at an extension (59a) thereof against the push disk (54). According to this structure, the clutch cylinder (44) is commonly employed for both of the clutches (45, 46). The structure that the cylinder portion (58) for receiving the second piston (59) is formed integrally with the clutch cylinder is simple, and the structure of the other clutch (46) is reasonable as a spring-actuated type.

For simplifying fluid passage structure in the clutch cylinder (44), it is preferred that the clutch cylinder (44) includes a fluid passage (62) for connecting the fluid passage (61) to the transmission shaft (11) to a fluid chamber (51) which is formed between the first piston (49) and the partition (44a), and another fluid passage (63) for connecting the fluid chamber (51) to a fluid chamber (60) in the cylinder portion (58). According to this structure, the former fluid chamber (51) acts as a fluid chamber for operating the first piston (49) and the latter fluid chamber (60) acts as a fluid chamber for operating the second piston (59). The fluid chamber (60) for operating the second piston (59) is supplied and drained with fluid pressure through the another fluid passage (63) and through the fluid chamber (60), so that the fluid passage structure in the clutch cylinder is simplified.

For shortening the clutch structure of the second supplementary speed change mechanism, it is preferred that the first piston (49) and the second piston (59) are partially overlapped in an axial direction of the clutch cylinder (44). According to this structure, the stroke of the first piston (49) and the stroke of the second piston (59) are partially overlapped in an axial direction of the clutch cylinder so that the clutch structure of the second supplementary speed change mechanism is shortened.

The present invention also relates to a speed change mechanism in a working vehicle which comprises two gears (40, 41 ) rotatably mounted on a transmission shaft (11) and two frictional clutches (45, 46) mounted on the transmission shaft for coupling the gears one at a time to the transmission shaft so as to perform a two-ratio speed change transmission. The speed change mechanism according to the present invention is characterized in:

that one of the clutches (45) is formed into a fluid-actuated clutch which is actuated by an engagement between a first set of frictional elements (47, 48) under the action of fluid pressure applied to a first piston (49) and which is disactuated by the force of a return spring (50) acting upon the first piston, whereas the other of the clutches (46) is formed into a spring-actuated clutch which is actuated by an engagement of a second set of frictional elements (52, 53) under the action of a spring (56) and which is disactuated under the action of fluid pressure applied to a second piston (59), and that the transmission shaft (11) includes a single operating fluid passage (61) for supplying fluid to the first piston (49) and to the second piston (59), fluid pressure being applied to and drained from the first and second pistons respectively at a same time through the fluid passage so as to perform the two-ratio speed change transmission.

According to this structure, when a trouble is caused in the fluid supply system for the speed change mechanism the spring-actuated frictional clutch (46) will be automatically engaged due to the loss of fluid pressure applied to the second piston (59). Consequently, the vehicle drive line is not cut off at the speed change mechanism, so that an engine brake action can be achieved. Because the fluid passage in the transmission shaft is a single one (61) and the single rotary joint (65) for such a single passage is satisfactory, the fluid passage structure for the speed change mechanism is very simple and the length of the transmission shaft (11) can be small.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
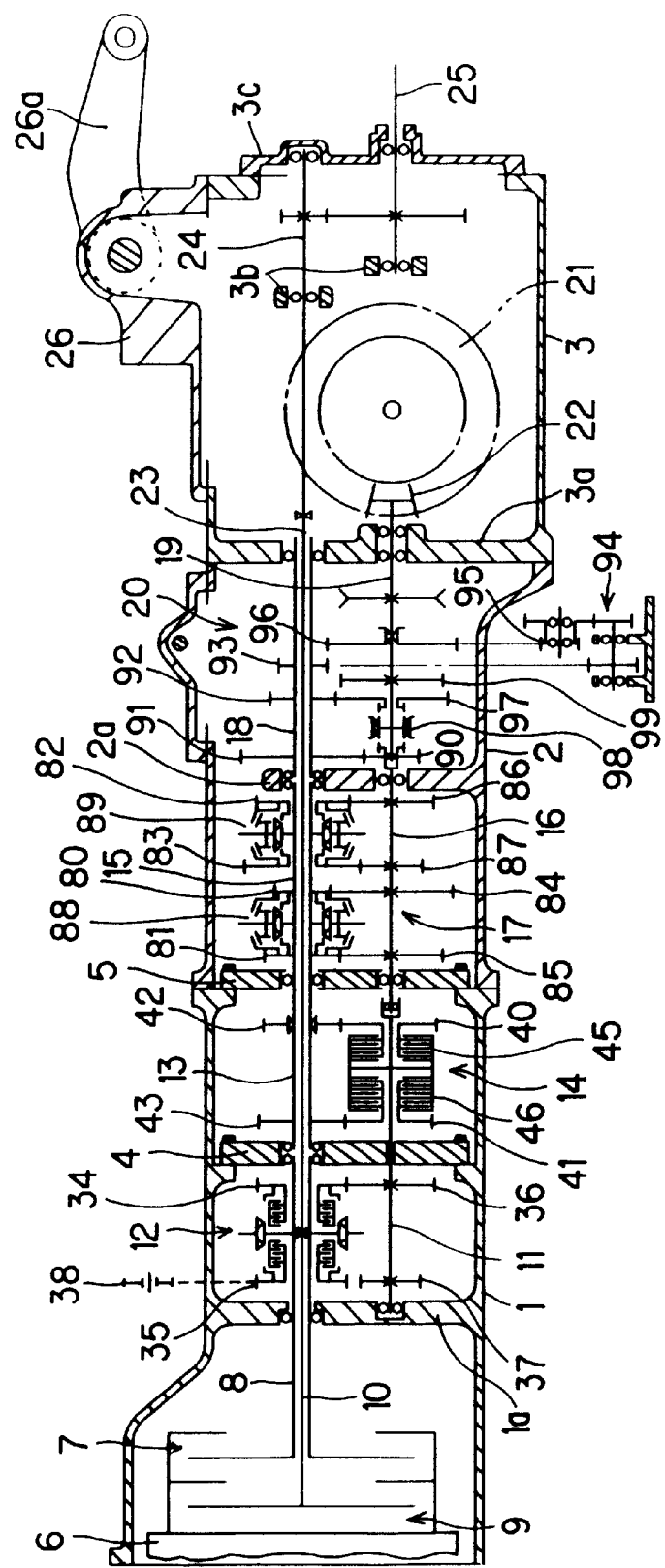
FIG. 1 is a diagram showing a transmission system employed in a tractor in which an embodiment of the present invention is employed.

FIG. 1 depicts a transmission system of a tractor in which an embodiment of the present invention is employed. The vehicle body of the tractor is composed of a front housing 1, a transmission case 2 and a rear housing 3 which are arranged in series in a longitudinal direction of the tractor and are fastened together. The front housing 1 includes an integral first bearing support wall 1a at an intermediate portion thereof, a second bearing support wall 4 which is located at a middle portion of the front housing 1 and behind the first bearing support wall 1a and which is removably secured to the front housing 1, and a third bearing support wall 5 which is located adjacent to a rear end of the front housing 1 and which is removably secured to the rear end of front housing 1. The transmission case 2 includes an integral bearing support wall 2a which is located at a middle portion of the transmission case 2. The rear housing 3 includes a front wall 3a, an integral bearing support wall 3b at an intermediate portion thereof, and a rear cover 3c which closes a rear end opening of the rear housing 3. An engine flywheel 6 is provided at a frontmost end of the interior of front housing 1. The front housing 1 includes a hollow primary drive shaft 8 of the vehicle drive line, which is connected to the engine flywheel 6 through a main clutch 7 for the vehicle drive line, and a primary drive shaft 10 of the PTO (power take-off) line which is connected to the engine flywheel 6 through a main clutch 9 for the PTO line. These primary drive shafts 8 and 10 are arranged co-axially with the engine flywheel 6.

Within the front housing 1, the vehicle drive line has a first supplementary speed change mechanism 12, which is arranged between the first and second bearing support wall 1a and 4, and a second supplementary speed change mechanism 14 which is arranged between the second and third bearing support walls 4 and 5. The first supplementary speed change mechanism 12 is disposed between the primary drive shaft 8 and a transmission shaft 11 which is arranged in parallel with the primary drive shaft 8 and below the primary drive shaft. The second supplementary speed change mechanism 14 is disposed between the transmission shaft 11 and a hollow output shaft 13 which is arranged co-axially with the primary drive shaft 8 and behind the primary drive shaft. Within the transmission case 2, the vehicle drive line has a main speed change mechanism 17, which is arranged within a front half of the transmission case 2, and an auxiliary speed change mechanism 20 which is arranged within a rear half of the transmission case 2. The main speed change mechanism 17 is disposed between a hollow drive shaft 15, which is arranged co-axially with and is connected to the output shaft 13, and a driven shaft 16 which is arranged co-axially with the transmission shaft 11. The auxiliary speed change mechanism 20 is disposed between the driven shaft 16 and a propeller shaft 19, which is arranged co-axially with the driven shaft 16, and includes a hollow counter shaft 18 which is arranged co-axially with the drive shaft 15. A rear end portion of the propeller shaft 19 extends into the rear housing 3 and has a bevel pinion 22 which is meshed with an input bevel gear 21 of a differential gearing (not shown) for left and right rear wheels.

The PTO line has a transmission shaft 23 which is connected to the primary drive shaft 10 of PTO line at an interior of the primary drive shaft 8 of vehicle drive line and which extends into the rear housing 3 through the hollow primary drive shaft 8, output shaft 13, drive shaft 15 and counter shaft 18, another transmission shaft 24 which is arranged co-axially with and is connected to the transmission shaft 23, and a PTO shaft 25 which extends rearwadly of the vehicle body through the rear cover 3c and which is connected to the transmission shaft 24 through a speed reduction gearing. On an upper surface of the rear housing 3, there is mounted a hydraulic lift mechanism 26 comprising left and right lift arms 26a for lifting and lowering an auxiliary implement (not shown) which is driven by the PTO shaft 25.

Figure 2:
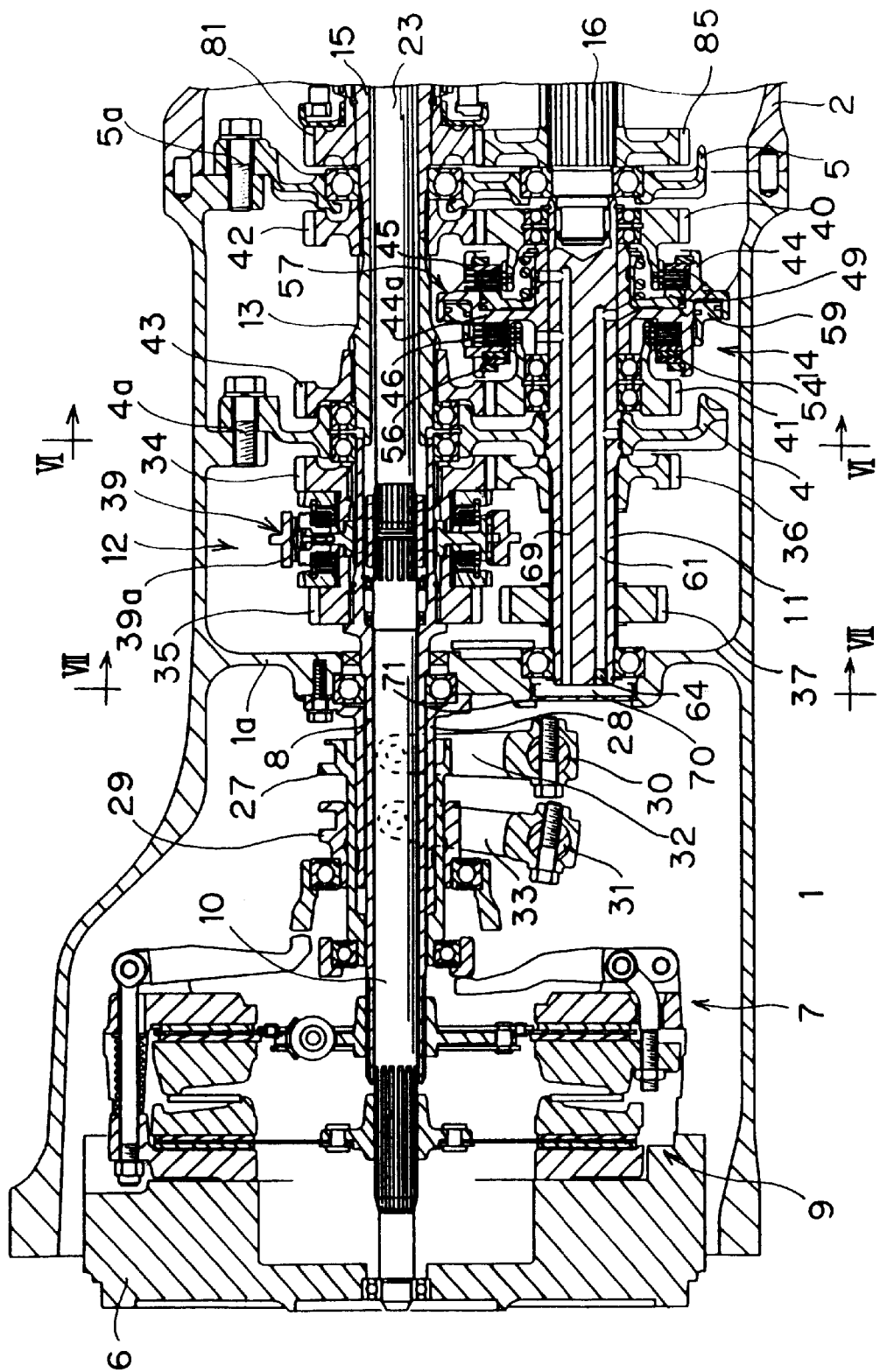
FIG. 2 is a sectional side view of a front housing of the tractor.

FIG. 2 depicts the transmission mechanisms in the front housing 1. The first bearing support wall 1a, which is arranged in front of the first supplementary speed change mechanism 12, is employed for supporting an intermediate portion of the primary drive shaft 8 and for supporting a front end portion of the transmission shaft 11. The second bearing support wall 4, which is arranged between the first and second supplementary speed change mechanisms 12 and 14, is secured to boss portions on the inner surface of front housing 1 from a backward direction using bolts 4a and is employed for supporting a rear end portion of the primary drive shaft 8 and a front end portion of the output shaft 13 and for supporting an intermediate portion of the transmission shaft 11. The third bearing support wall 5, which is arranged behind the second supplementary speed change mechanism 14, is secured to boss portions on the inner surface of the front housing 1 from a backward direction using bolts 5a and is employed for supporting a rear end portion of the output shaft 13 through the drive shaft 15 and for supporting a rear end portion of the transmission shaft 11 through the driven shaft 16.

Each of the main clutch 7 of vehicle drive line and the main clutch 9 of PTO line is formed into a well-known frictional clutch. A shifter sleeve 27 for operating the clutch 7 is slidably mounted on a guide sleeve 28 which is disposed on the primary drive shaft 8 and is secured to the first bearing support wall 1a, and a shifter sleeve 29 for operating the clutch 9 is slidably mounted on the shifter sleeve 27. The shifter sleeves 27 and 29 are operated to slide respectively by laterally extending control shafts 30 and 31, which are rotatably supported by the front housing 1 and extends through this housing, through arms 32 and 33.

The first supplementary speed change mechanism 12 is formed into a direction-reversing mechanism and comprises two gears 34 and 35, which are rotatably mounted on the main drive shaft 8, and two gears 36 and 37 which are fixedly mounted on a front half of the transmission shaft 11. The gears 34 and 36 are meshed directly, and the gears 35 and 37 are meshed through an idler gear 38 (FIG. 1). On the primary drive shaft 8 and between the gears 34 and 35, there is mounted a double-acting synchronizer clutch 39 which is well-known from, for example, U.S. Pat. No. 4,830,159. When a shifter sleeve 39a of the synchronizer clutch 39 is shifted to slide into one or the other direction so as to couple the gear 34 or 35 to the primary drive shaft 8, the transmission shaft 11 is driven to rotate so as to drive the vehicle to run into a forward or backward direction.

The second supplementary speed change mechanism 14 is formed into a high/low speed-selecting mechanism. As shown in FIG. 2 and in FIG. 3 which depicts a part of FIG. 2 in an enlarged scale, two gears 40 and 41 are rotatably mounted on a rear haft of the transmission shaft 11 and two gears 42 and 43 are fixedly mounted on the output shaft 13. The gears 40 and 42 are meshed so as to provide a high speed gear train, and the gears 41 and 43 are meshed so as to provide a low speed gear train. On the transmission shaft 11 and between the gears 40 and 41, there are disposed two frictional clutches 45 and 46 for which a common clutch cylinder 44 is fixedly mounted on the transmission shaft 11. The frictional clutch 45 is operable to couple the gear 40 to the transmission shaft 11, and the frictional clutch 46 is operable to couple the gear 41 to the transmission shaft 11. The clutch cylinder 44 has, at its axial middle portion, a partition 44a which separates the frictional clutches 45 and 46 from each other.

Figure 3:
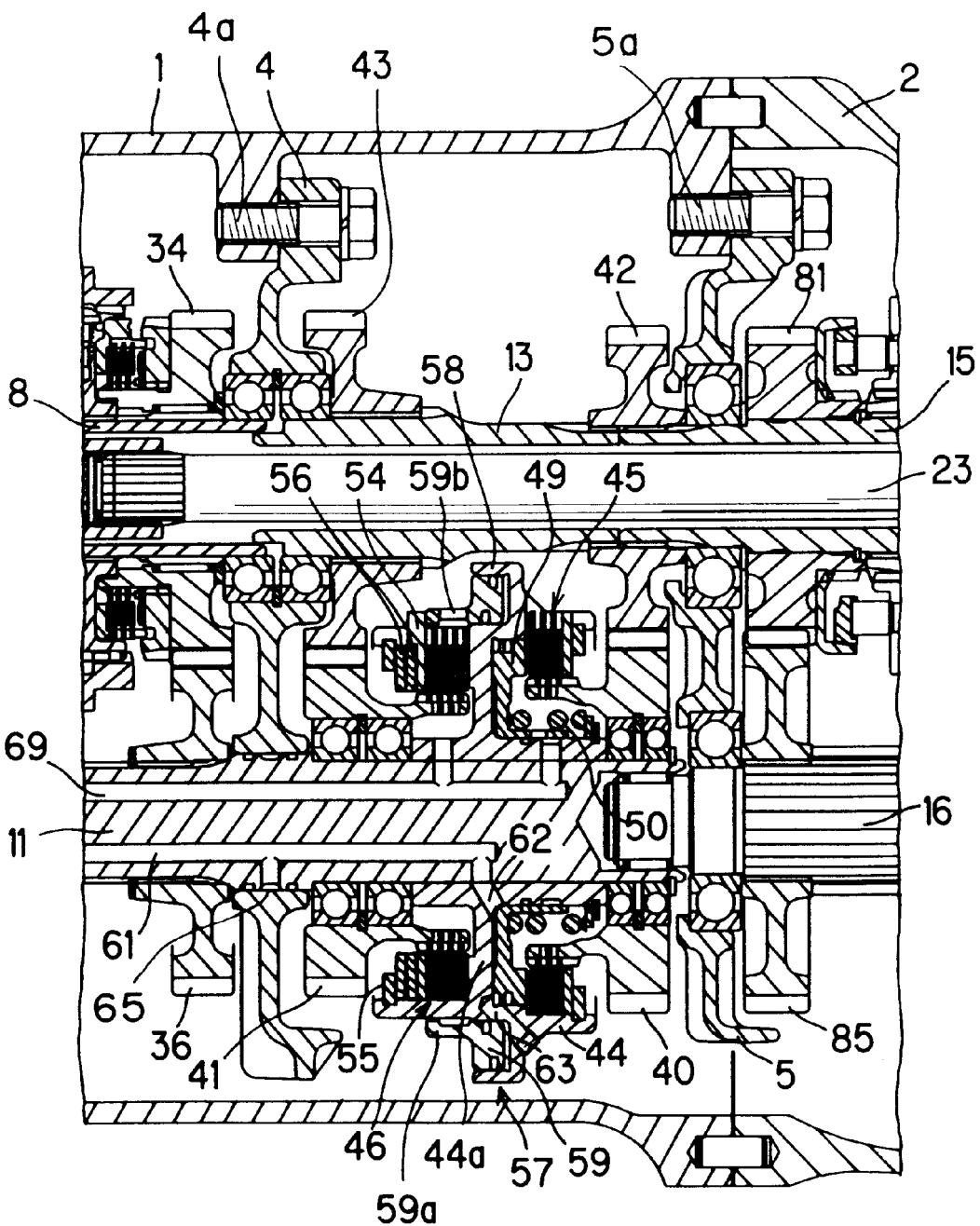
FIG. 3 is an enlarged sectional side view of a part shown in FIG. 2.
Figure 4:
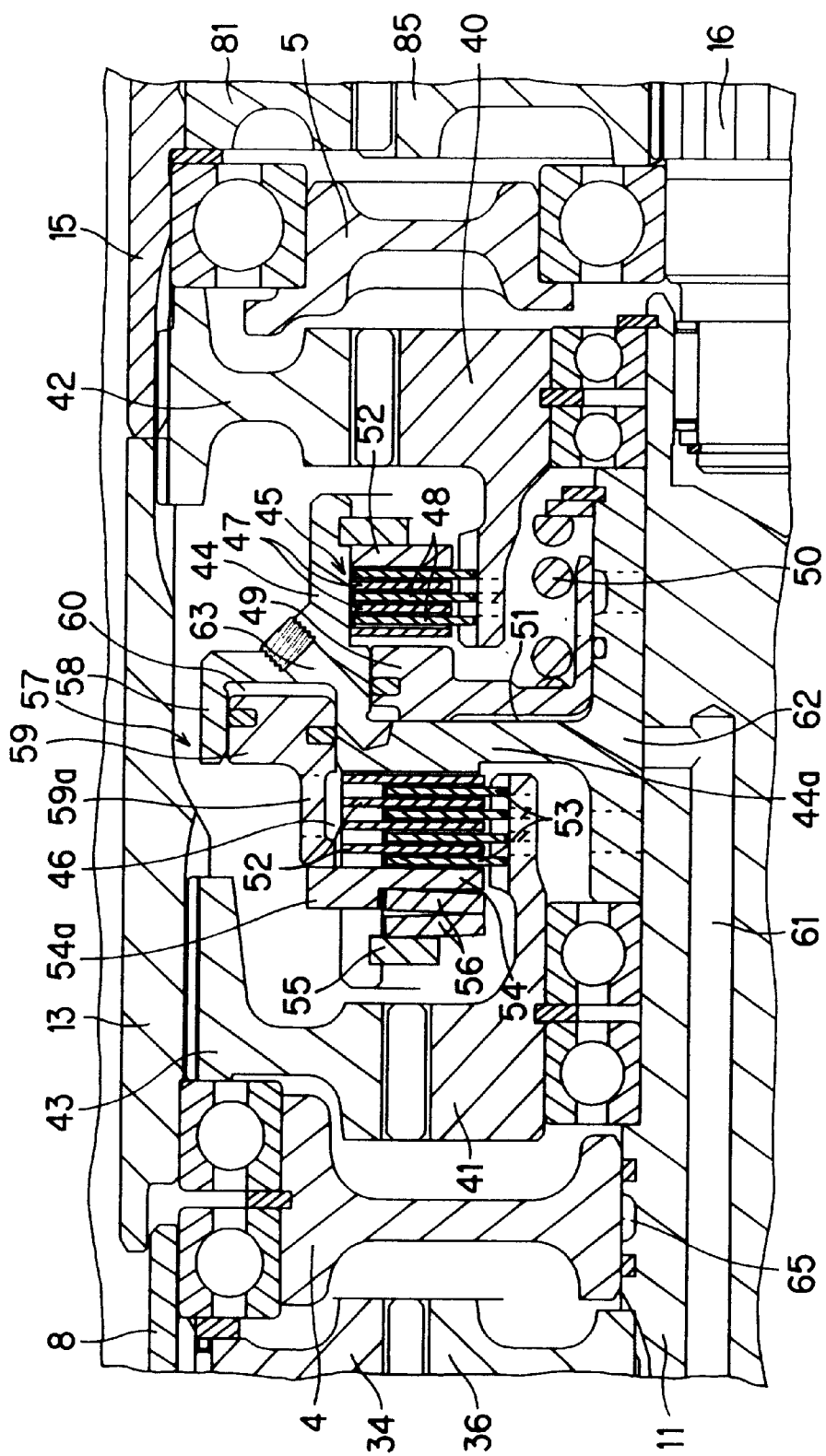
FIG. 4 is an enlarged sectional side view of a part shown in FIG. 3.
Figure 5:
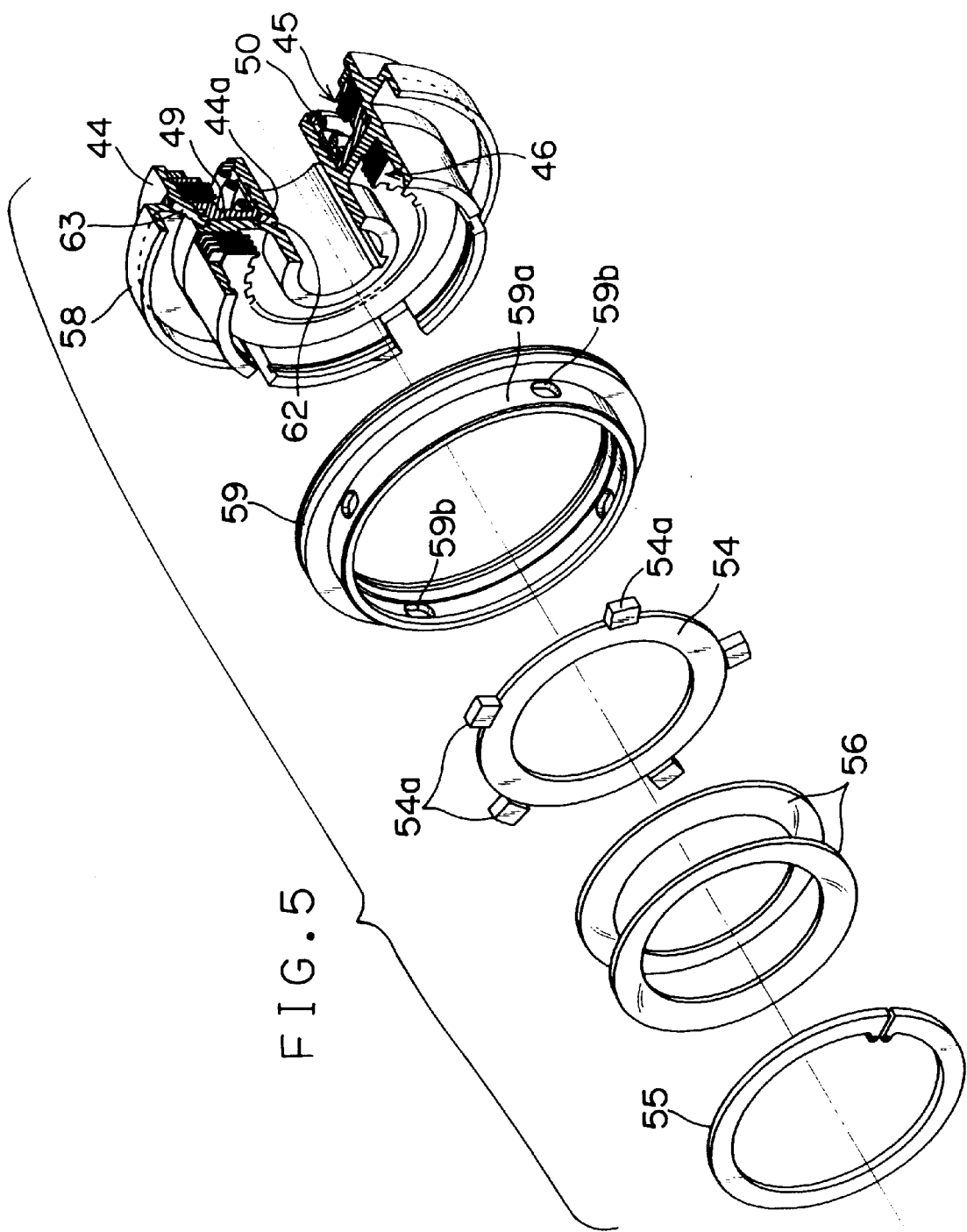
FIG. 5 is an exploded perspective view showing the structure of frictional clutches employed in the tractor.

As shown in FIG. 3, in FIG. 4 which depicts a part of FIG. 3 in an enlarged scale, and in FIG. 5 which is an exploded perspective view of the frictional clutches 45 and 46, one of the frictional clutches 45 is formed into a fluid-actuated clutch comprising alternately arranged first frictional elements 47 and second frictional elements 48 which are slidably but non-rotatably supported respectively by the clutch cylinder 44 and by a boss portion of the gear 40, and a piston 49 which is biased to move toward a direction away from the frictional elements 47 and 48 by a return spring 50. The piston 50 is disposed at a location adjacent to the partition 44a, and a fluid chamber 51 is formed between the partition 44a and the piston 49. When a fluid pressure is conducted into the fluid chamber 51 and is applied to the piston 49 so as to move the piston, the frictional elements 47 and 48 are pushed against a reaction plate 52, which is supported by the clutch cylinder 44 so as a to be restrained from slinding movement, and are engaged with one another whereby the frictional clutch 45 is engaged.

As also shown in FIGS. 3 to 5, the other frictional clutch 46 is formed into a spring-actuated clutch comprising alternately arranged first frictional elements 52 and second frictional elements 53 which are slidably but non-rotatably supported respectively by the clutch cylinder 44 and by a boss portion of the gear 41, and leaf springs 56 disposed between a push disk 54, which is slidably but non-rotatably supported by the clutch cylinder 44, and a retaining ring 55, which is secured to the clutch cylinder 44, such that the frictional elements 52 and 53 are biased to move by the leaf springs 56 against the partition 44a and are engaged with one another whereby the frictional clutch 46 is engaged.

For disengaging the frictional clutch 46, a hydraulic cylinder 57 is provided. As clearly shown in FIGS. 4 and 5, the hydraulic cylinder 57 comprises an annular cylinder portion 58, which is formed integral with the clutch cylinder 44 at an outer circumferential portion of the partition 44a, and an annular piston 59 which is slidably received in the cylinder portion 58 in a fluid-tight manner. The piston 59 has an extension 59a extending toward the push disk 54 which is supported by the clutch cylinder 44 by inserting plural projections 54a on an outer periphery thereof into plural axial slits in the clutch cylinder 44, arid the extension 59a of piston 59 abuts against the free ends of projections 54a, which project outwardly of the clutch cylinder, such that, when the piston 59 is advanced by fluid pressure supplied to a fluid chamber 60 in the cylinder portion 58 so as to move the push disk 54 against the biasing force of springs 56, the frictional clutch 46 becomes disengaged. The extension 59a of piston 59 includes plural bores 59b for exhausting lubricant from the frictional clutch 46. The piston 59 is arranged such that this piston is partially overlapped with the piston 49 of frictional clutch 45 in an axial direction of the clutch cylinder 44.

As shown in FIGS. 2 to 4, a single operating fluid passage 61 is formed in the transmission shaft 11 and is communicated to the fluid chamber 51 in the clutch cylinder 44 through a fluid passage 62 in the clutch cylinder. Another fluid passage 63 for communicating the fluid chamber 51 to the fluid chamber 60 in the hydraulic cylinder 57 is also formed in the clutch cylinder 44. The piston 49 of frictional clutch 45 and the hydraulic cylinder 57 are supplied with fluid pressure from the fluid passage 61 in the transmission shaft 11 at a same time through these fluid passages 62 and 63 in the clutch cylinder 44. Also, fluid pressure applied to the piston 49 and fluid pressure applied to the hydraulic cylinder 57 are drained into the fluid passage 61 at a same time through the fluid passages 62 and 63 in the clutch cylinder 44.

Figure 6:
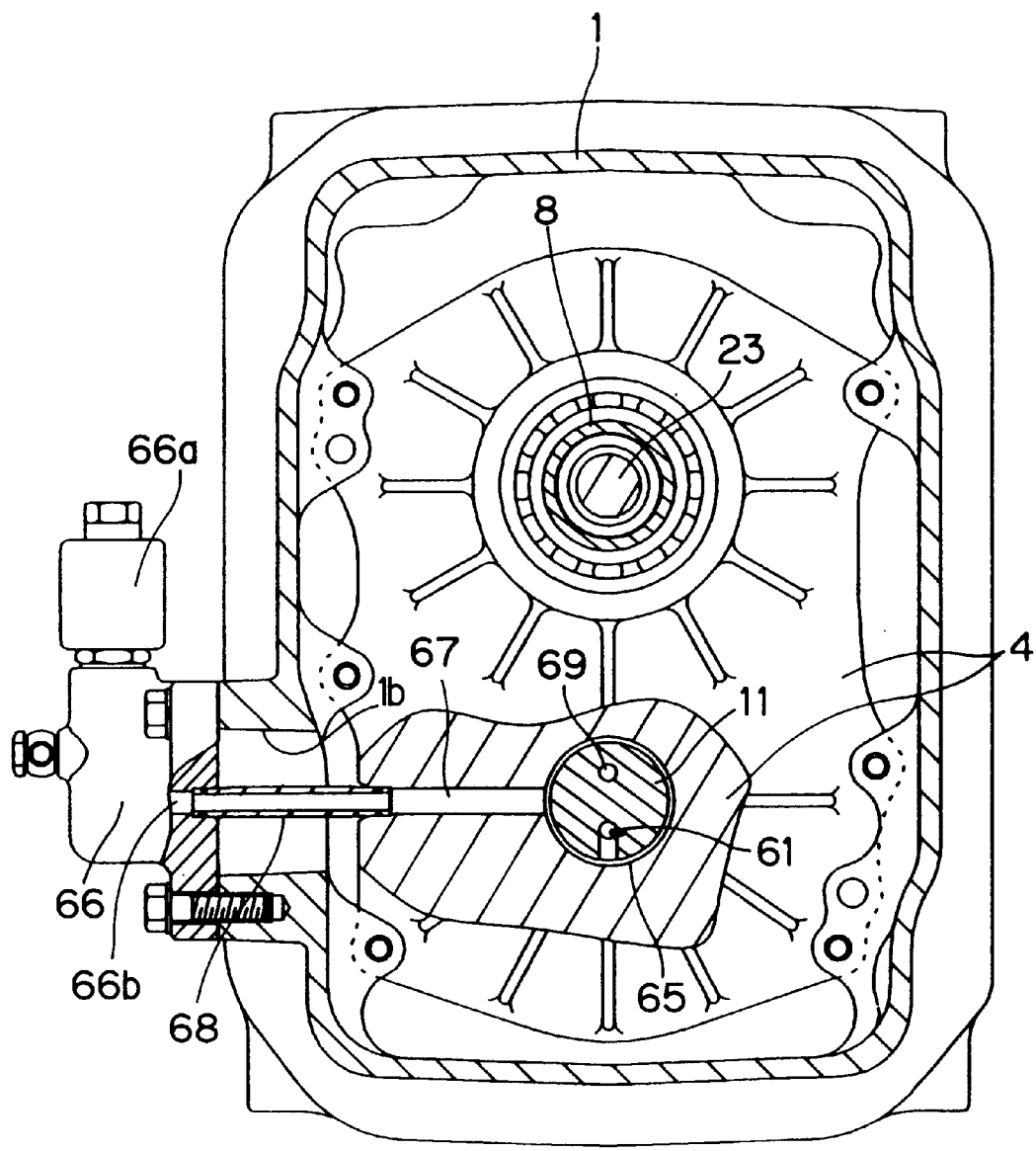
FIG. 6 is a sectional view taken generally along line VI—VI of FIG. 2.

As shown in FIG. 2, the fluid passage 61 is perforated or bored from a front end surface of the transmission shaft 11 and the boring end of this passage 61 is closed by a threaded plug 64. As clearly shown in FIGS. 3 and 4, the fluid passage 61 opens into an annular groove in an outer circumference of the transmission shaft 11 which groove is located in the second bearing support wall 4 supporting an intermediate portion of the transmission shaft 11. An outer peripheral opening of the groove is covered by an inner surface of a shaft-passing bore in the bearing support wall 4 so as to provide a rotary joint 65 for connecting the rotatable fluid passage 61 in the transmission shaft 11 to a stationary fluid passage. As shown in FIG. 6, an electromagnetic directional control valve 66 having a solenoid 66a is secured to an outer side surface of the front housing 1. A fluid pressure supply and drain port 66b of the directional control valve 66 is connected to a fluid passage 67, which is formed in the bearing support wall 4 so as to be in fluid communication with the rotary joint 65, by a pipe 68 which extends through an opening 1b in the front housing 1.

Figure 7:
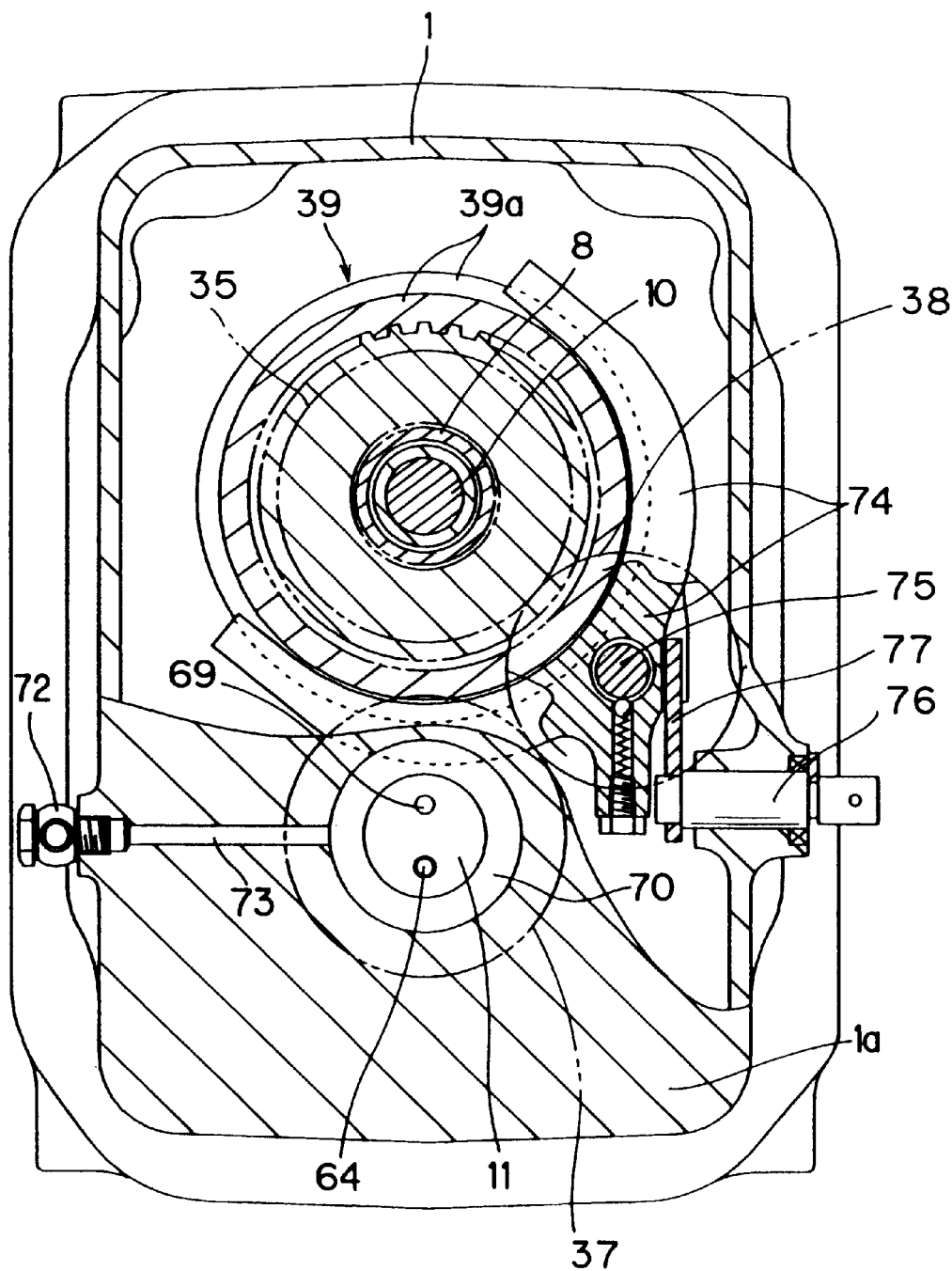
FIG. 7 is a sectional view taken generally along line VII—VII of FIG. 2.

As shown in FIGS. 2 and 3, a lubricant passage 69 for supplying lubricant to the frictional elements of frictional clutches 45 and 46 is also perforated or bored in the transmission shaft from the front end surface thereof. As shown in FIG. 2, a rotary joint 70 for connecting the lubricant passage 69 to a stationary fluid passage is formed between the front end surface of transmission shaft 11 and a cover member 71 which is secured to the first bearing support wall 1a so as to cover an opening for supporting a front end portion of the transmission shaft 11. The cover member 71 can be replaced by an integral part of the bearing support wall 1a which corresponds to the cover member. As shown in FIG. 7, a coupling member 72 for connecting a lubricant supply pipe is secured to an outer side surface of the front housing 1 and the rotary joint 70 is connected to the coupling member 72 through a lubricant passage 73 which is formed in the first bearing support wall 1a.

In FIG. 7, numeral 74 designates a shift fork for operating the shifter sleeve 39a of the synchronizer clutch 39 in the first supplementary speed change mechanism 12. The shift fork 74 is slidably mounted on a fork shaft 75, which is fixedly supported by the first and second bearing support walls 1a and 4, and is engaged by an arm 77 secured to a rotatable control shaft 76 which extends through a side wall of the front housing 1. As schematically shown in FIG. 7, the idler gear 38 which is meshed with the gears 35 and 37 in the first supplementary speed change mechanism 12 is mounted on the fork shaft 75.

As shown in FIGS. 2 and 3, the hollow output shaft 13 and the hollow drive shaft 15 are connected to each other using a boss portion of the gear 42 in the second supplementary speed change mechanism 14 as a coupling member. As described before, a rear end portion of the output shaft 13 is supported by the third bearing support wall 5 through the drive shaft 15. A rear end of the transmission shaft 11 is formed into a hollow shaft-receiving portion in which a front end portion of the driven shaft 16 is receive. As described before, a rear end portion of the transmission shaft 11 is supported by the third bearing support wall 5 through the driven shaft 16.

Figure 8:
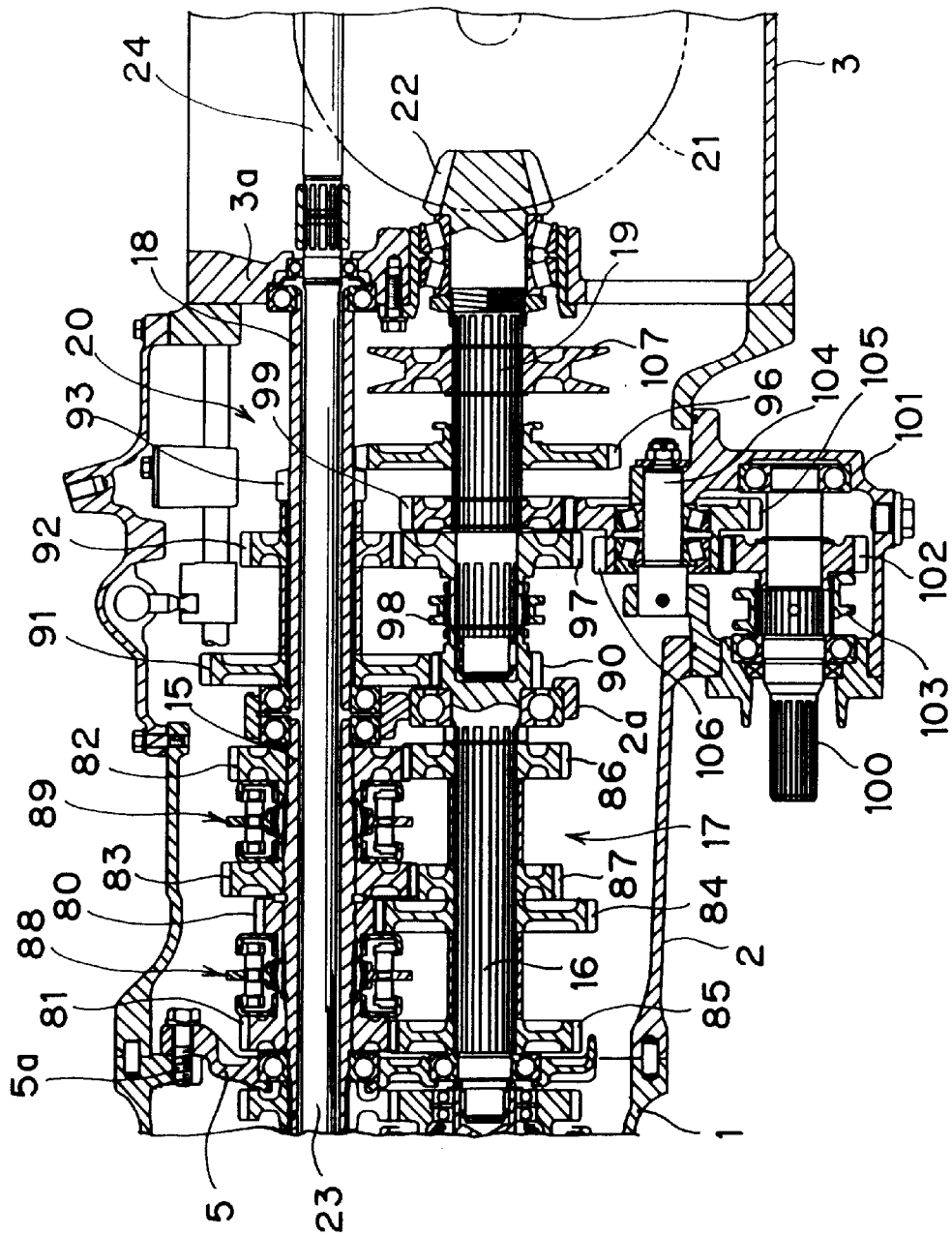
FIG. 8 is a sectional side view of a transmission case of the tractor.

Structure of the speed change mechanisms 17 and 20 in the transmission case 2 will be detailed by referring to FIG. 8. The main speed change mechanism 17 comprises four gears 80, 81, 82 and 83 which are rotatably mounted on the drive shaft 15, four gears 84, 85, 86 and 87 which are fixedly mounted on the driven shaft 16 and are meshed respectively with corresponding gears on the drive shaft, and two double-acting synchronizer clutches 88 and 89 which are mounted on the drive shaft 15 at locations between the gears 80 and 81 and between the gears 82 and 83. The main speed change mechanism 17 provides four speed change ratios by selectively coupling the gears 80 to 83 one at a time to the drive shaft 15.

As also shown in FIG. 8, the counter shaft 18 of auxiliary speed change mechanism 20 is connected to the driven shaft 16 through a speed reduction gearing of gears 90 and 91. Two gears 92 and 93 are fixedly mounted on the counter shaft 18, and a gear 95 (FIG. 1) which is connected to the gear 93 through a speed reduction gear mechanism 94 is provided at a location outside the counter shaft 18. On the propeller shaft 19, a shift gear 96, which is meshable with the gear 95, is slidably but non-rotatably mounted and a gear 97, which is meshed with the gear 92, is rotatably mounted. Further, there is mounted on the propeller shaft 19 a double-acting clutch 98 which is selectively shifted to a position, where it couples the gear 97 to the propeller shaft 19, and to another position where it couples the propeller shaft 18 directly to the driven shaft 16. The auxiliary speed change mechanism 20 provides to the propeller shaft 19 a first speed rotation when the shift gear 96 is meshed with the gear 95, a second speed rotation when the gear 97 is coupled to the propeller shaft 19 by the clutch 98 and a third speed rotation when the propeller shaft 19 is coupled to the driven shaft 16 by the clutch 98.

As also shown in FIG. 8, an output gear 99 is fixedly mounted on the propeller shaft 19 for enabling the drive of front wheels not shown in the drawings. A drive case 101, which includes a front wheel-driving shaft 100, is secured to a bottom wall of the transmission case 2. On the front-wheel driving shaft 100 is rotatably mounted a gear 102 which can be coupled to the shaft 100 by a front wheel-driving clutch 103. The gear 102 is connected to the drive gear 99 through integral gears 105 and 106 which are rotatably mounted on a shaft 104 supported by the drive case 101. A pulley 107 is fixedly mounted on the propeller shaft 19 and is employed for a rotatable member to be braked by a parking brake not shown in the drawings.

Figure 9:
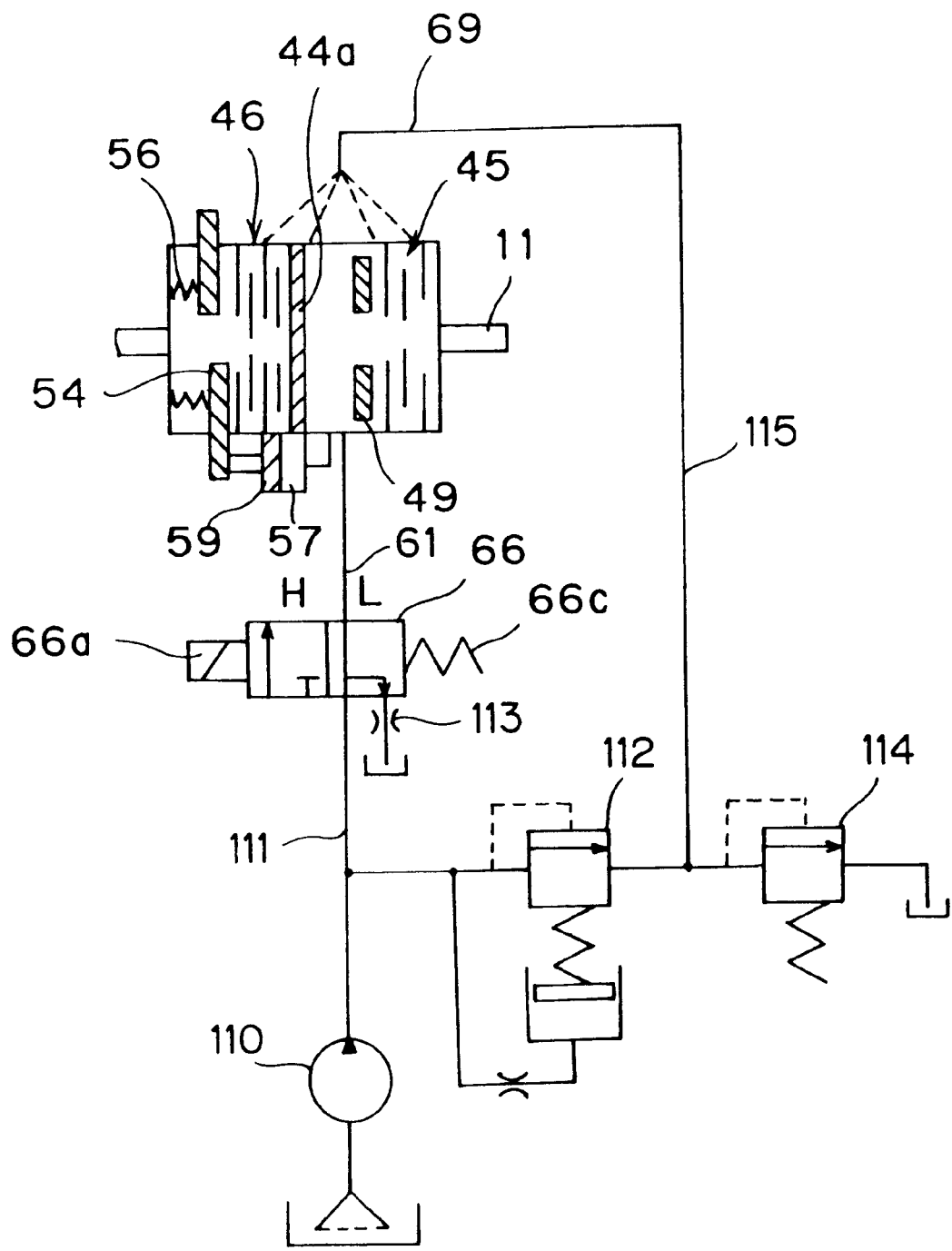
FIG. 9 is a circuit diagram showing a fluid circuit for the frictional clutches.

FIG. 9 depicts schematically a fluid circuit for the frictional clutches 45 and 46. The above-referenced electromagnetic directional control valve 66 is connected at its inlet side to a discharge passage 111 of a hydraulic pump 110 and at the outlet side to the frictional clutches 45 and 46 through the above-referenced fluid passage 61 etc. The directional control valve 66 has a low speed position L where the valve 66 is positioned by the biasing force of a spring 66c, and a high speed position H where the valve 66 is positioned by the energization of solenoid 66a. In order to increase fluid pressure applied to the piston 49 of frictional clutch 45 and to the hydraulic cylinder 57 gradually as from the time when the directional control valve 66 is displaced from the low speed position L to the high speed position H, a well-known pressure-modulating type relief valve 112 is connected to the discharge passage 111. In order to drain fluid pressure gradually as from the time when the directional control valve 66 is displaced from the high speed position H to the low speed position L by the deenergization of solenoid 66a, a throttle 113 is incorporated in a drain passage which connects the valve 66 to a fluid reservoir. To a downstream side of the relief valve 112 is connected a secondary relief valve 114 for determining lubricant pressure, and a lubricant supply passage 115 is branch from a passage between the relief valves 112 and 114 and is connected to the above-referenced lubricant passage 69. The position of electromagnetic directional control valve 66 is controlled by a controller not shown in the drawings by means of switches at a steering portion of the vehicle or by means of signals from a load-detecting sensor and the like. Of course, a manual directional control valve can also be employed.

Figure 10:
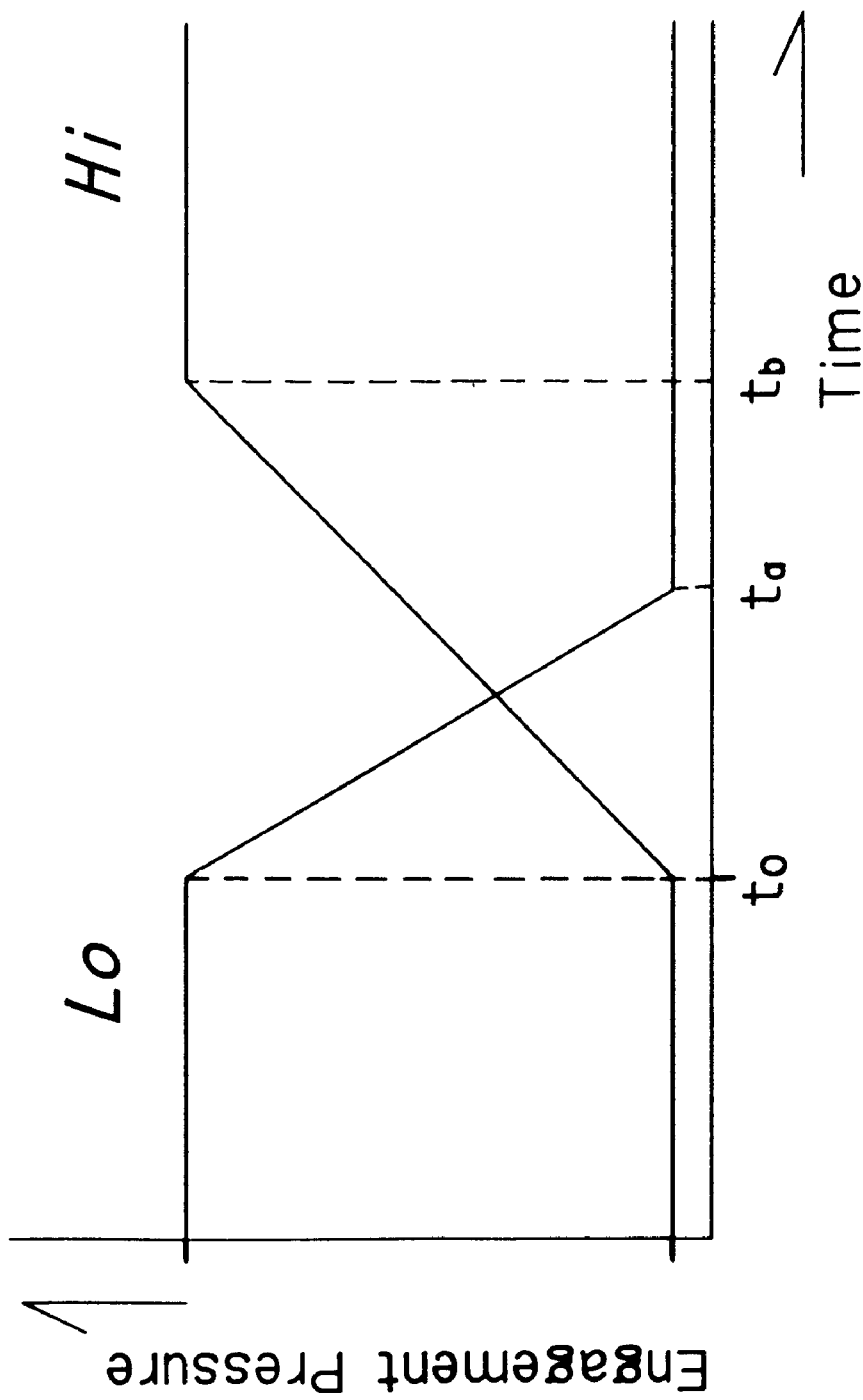
FIG. 10 is a schematic graph showing the change of engagement pressure of the frictional clutches.

FIG. 10 depicts schematically the change in engagement pressure of the frictional elements 47 and 48 of frictional clutch 45 and the change in engagement pressure of the frictional elements 52 and 53 of frictional clutch 46. Curve Hi represents the change at the frictional clutch 45, and curve Li represents the change at the frictional clutch 46. Engagement pressure of the frictional elements 52 and 53 of frictional clutch 46 due to the force of springs 56 is predetermined to be substantially equal to engagement pressure of the frictional elements 47 and 48 of frictional clutch 45 due to fluid pressure determined by the relief valve 112. The electromagnetic directional control valve 66 is displaced from the low speed position L to the high speed position H at time $t_o$ and, thereafter, fluid pressure applied to the piston 49 of frictional clutch 45 and to the hydraulic cylinder 57 is gradually increased by the modulating-type relief valve 112. Consequently, the frictional clutch 46 is gradually disengaged through slippingly engaged conditions and the frictional clutch 45 is gradually engaged through slippingly engaged conditions. The ratio between the pressure-receiving area of piston 49 and the pressure-receiving area of piston 59 is predetermined such that the time ta, at which the frictional clutch 46 for obtaining the low speed is fully disengaged, is earlier than the time tb at which the frictional clutch 45 for obtaining the high speed is fully engaged.

When a trouble is caused in the fluid supply system for the second supplementary speed change mechanism 14, the spring-actuated frictional clutch 46 will be automatically engaged by the force of springs 56 due to the drain of fluid from the hydraulic cylinder 57. Consequently, the vehicle drive line is not cut off at the second supplementary speed change mechanism 14, so that an engine brake action can be achieved.

Figure 11:
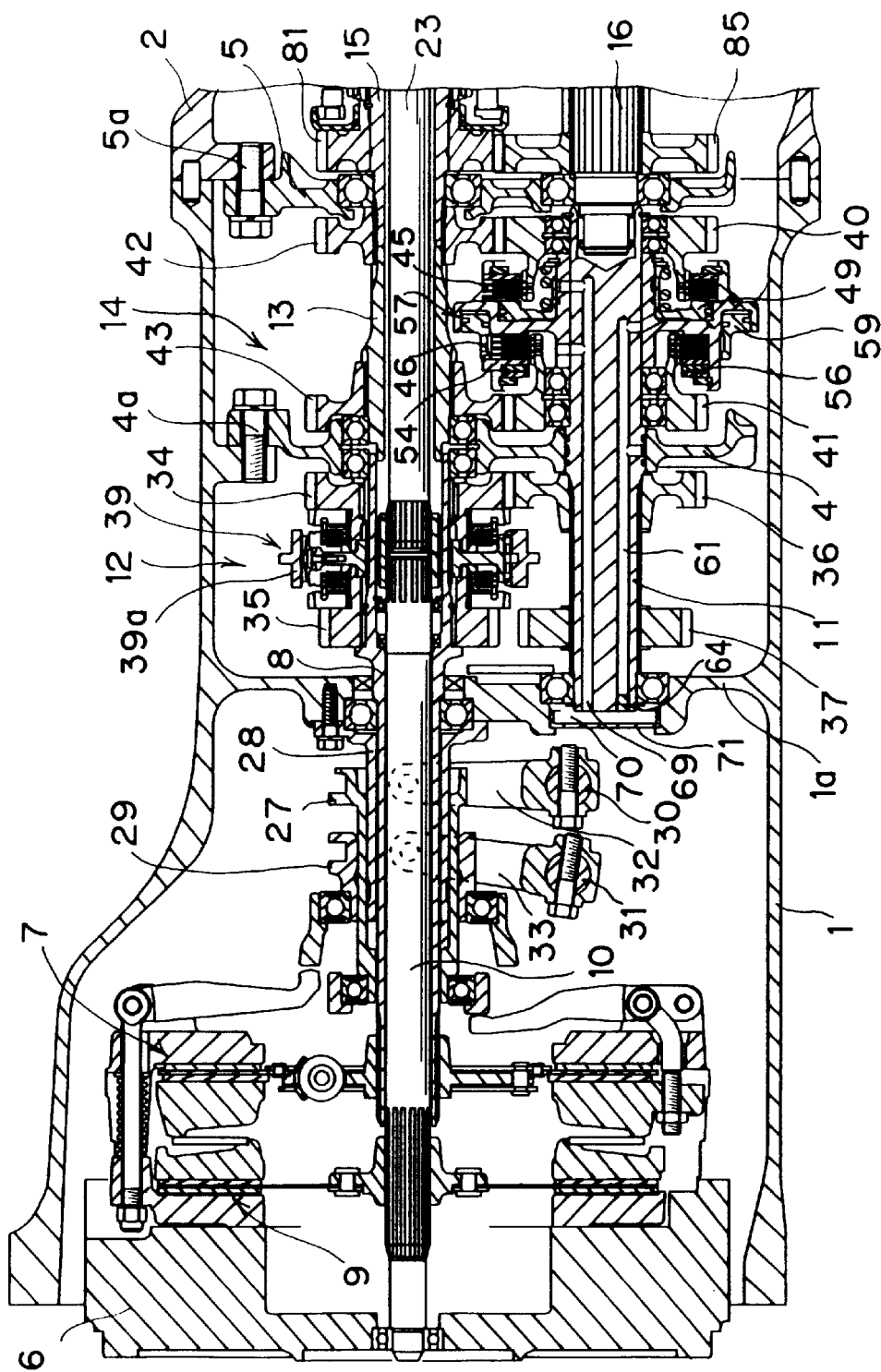
FIG. 11 is a sectional side view of a front housing of a tractor in which a second embodiment of the present invention is employed.

In the embodiment having been detailed above, the third bearing support wall 5 is disposed behind the second supplementary speed change mechanism 14 by removably securing the same to the front housing 1. Alternatively, the third bearing support wall 5 can be disposed behind the second supplementary speed change mechanism 14, as in a second embodiment shown in FIG. 11, by removably securing the same to boss portions on an inner surface of front end portion of the transmission case 2 using bolts 5a which are threadingly engaged with threaded bores in the boss portions from a forward direction. Further, the transmission system in the front housing 1 can be altered such that the first supplementary speed change mechanism 12 is formed into a high/low speed-selecting mechanism whereas the second supplementary speed change mechanism 14 is formed into a direction-reversing mechanism.

Figure 12:
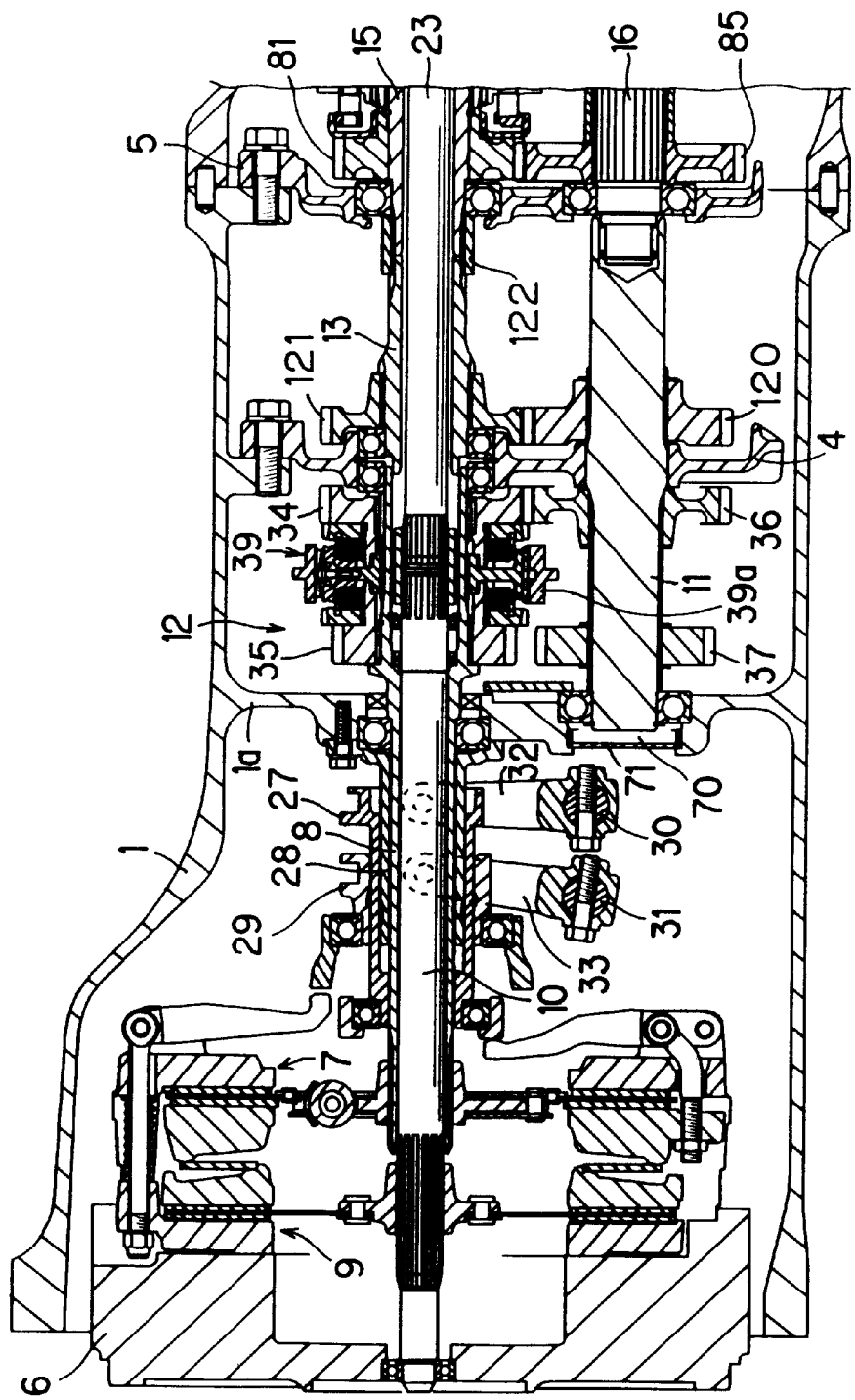
FIG. 12 is a sectional side view of a front housing showing an example in which the transmission system according to the present invention is altered into another type.

The vehicle drive transmission, in which the transmission system according to the present invention is employed, can be altered into a variety of transmissions without a substantial change in the speed change mechanisms 17 and 20 in the transmission case 2 by omitting the first or second supplementary speed change mechanism 12 or 14 in the front housing 1. FIG. 12 depicts an example in which the second supplementary speed change mechanism 14 is omitted. In this example, the transmission shaft 11 is connected to the output shaft 13 through meshing gears 120 and 121. A coupling member 122 is used in place of the gear 42 for connecting between the output shaft 13 and the drive shaft 15.

Figure 13:
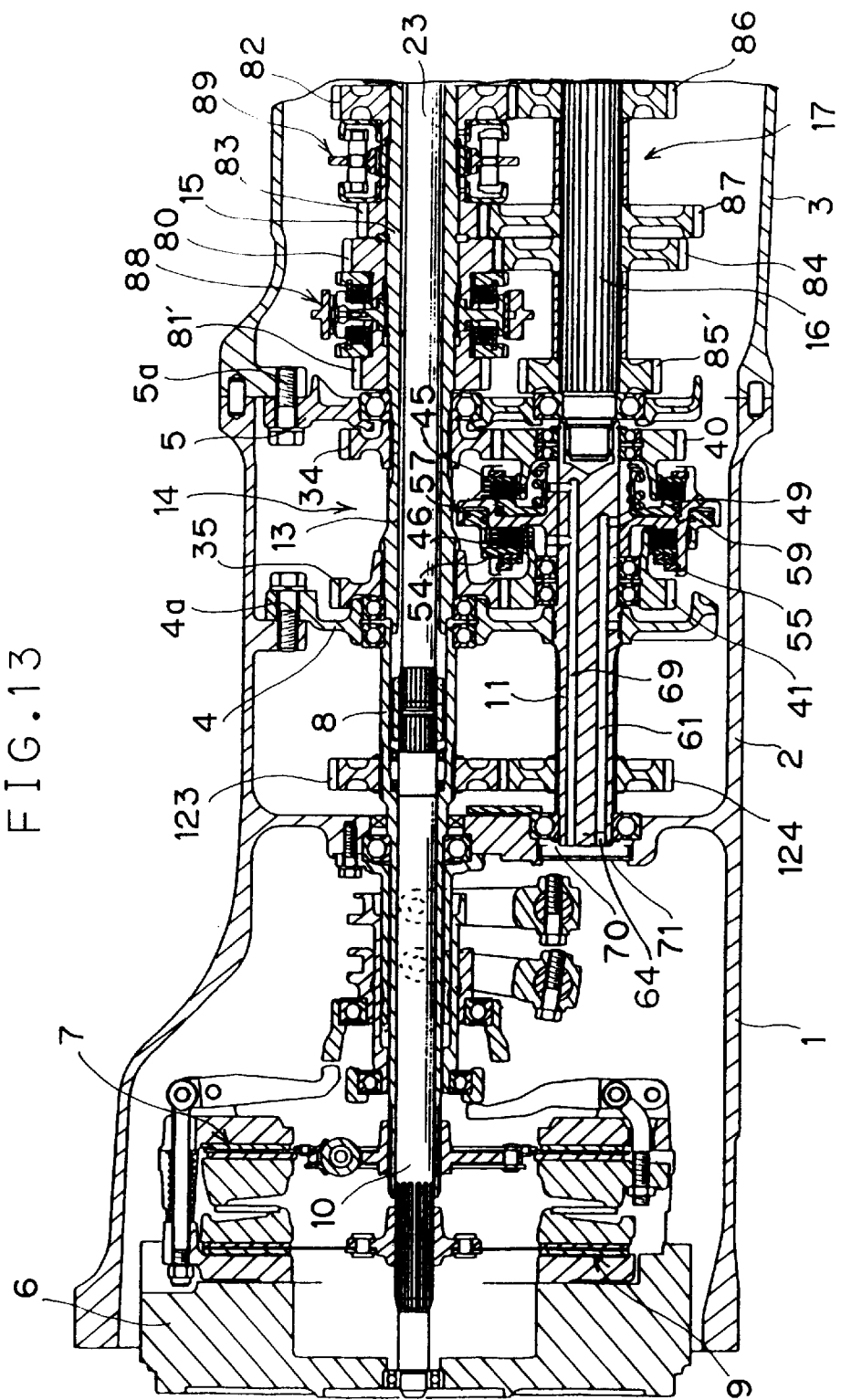
FIG. 13 is a sectional side view of a front housing and a transmission case showing another example in which the transmission system according to the present invention is altered into another type.

FIG. 13 depicts another example in which the first supplementary speed change mechanism 12 is omitted. In this example, the primary drive shaft 8 is connected to the transmission shaft 11 through meshing gears 123 and 124. For obtaining the backward directional running of vehicle, one of the gear trains of main speed change mechanism 17 is altered such that a gear 85' rotatably mounted on the drive shaft 15 and a gear 85' fixedly mounted on the driven shaft 16 are meshed through an idler gear (not shown). The double-acting synchronizer clutch 85, which is mounted on the drive shaft 15 at a location between the gears 81' and 80, is altered into a frictional type. The third bearing support wall 5 shown in FIG. 13 is removably secured to the transmission case 2.

I claim:

1. In a working vehicle comprising a front housing (1) and transmission case (2) which are arranged in series in a longitudinal direction of the vehicle and are fastened together, said front housing including at its front end portion an engine flywheel (6) and said transmission case including at least one speed change mechanism (17, 20), a transmission system characterized in:

that there are provided in said front housing (1) a primary drive shaft (8) which is co-axial with said engine flywheel (6) and is adapted to be driven to rotate by said engine flywheel, a transmission shaft (11) which is arranged in parallel with said primary drive shaft, and an output shaft (13) which is co-axial with said primary drive shaft, said output shaft (13) being connected to said speed change mechanism (17, 20); and that a first two-ratio supplementary speed change mechanism (12) is disposed between said primary drive shaft (8) and said transmission shaft (11) for driving said transmission shaft by said primary drive shaft selectively at one speed selected from two different speeds and a second two-ratio supplementary speed change mechanism (14) is disposed between said transmission shaft (11) and said output shaft (13) for driving said output shaft by said transmission shaft selectively at one speed selected from two different speeds, one of said first and second supplementary speed change mechanism (12) being formed into a direction-reversing mechanism and the other of said first and second supplementary speed change mechanism (14) being formed into a high/low speed-selecting mechanism.

2. The transmission system as set forth in claim 1, wherein said front housing (1) includes a first bearing support wall (1a) disposed before said first supplementary speed change mechanism (12) and a second bearing support wall (4) disposed between said first and second supplementary speed change mechanisms (12, 14), and wherein a third bearing support wall (5) disposed behind said second supplementary speed change mechanism (14) is provided at a location adjacent to a rear end of said front housing (1), said second bearing support wall (4) being removably secured to said front housing (1) and said third bearing support wall (5) being removably secured to said front housing (1) or to said transmission case (2).

3. In a working vehicle comprising a front housing (1) and transmission case (2) which are arranged in series in a longitudinal direction of the vehicle and are fastened together, said front housing including at its front end portion an engine flywheel (6) and said transmission case including at least one speed change mechanism (17, 20), a transmission system characterized in:

that there are provided in said front housing (1) a primary drive shaft (8) which is co-axial with said engine flywheel (6) and is adapted to be driven to rotate by said engine flywheel, a transmission shaft (11) which is arranged in parallel with said primary drive shaft, and an output shaft (13) which is co-axial with said primary drive shaft, said output shaft (13) being connected to said speed change mechanism (17, 20);

that a first two-ratio supplementary speed change mechanism (12) is disposed between said primary drive shaft (8) and said transmission shaft (11) for driving said transmission shaft by said primary drive shaft selectively at one speed selected from two different speeds and a second two-ratio supplementary speed change mechanism (14) is disposed between said transmission shaft (11) and said output shaft (13) for driving said output shaft by said transmission shaft selectively at one speed selected from two different speeds, one of said first and second supplementary speed change mechanism (12) being formed into a direction-reversing mechanism and the other of said first and second supplementary speed change mechanism (14) being formed into a high/low speed-selecting mechanism;

wherein said front housing (1) includes a first bearing support wall (1a) disposed before said first supplementary speed change mechanism (12) and a second bearing support wall (4) disposed between said first and second supplementary speed change mechanisms (12, 14), and wherein a third bearing support wall (5) disposed behind said second supplementary speed change mechanism (14) is provided at a location adjacent to a rear end of said front housing (1), said second bearing support wall (4) being removably secured to said front housing (1) and said third bearing support wall (5) being removably secured to said front housing (1) or to said transmission case (2);

wherein said second supplementary speed change mechanism (14) includes two clutches (45, 46) which are mounted on said transmission shaft (11) and which are selectively supplied with fluid pressure for performing two-ratio speed change transmission, and wherein said transmission shaft (11) includes at least one fluid passage (61) for supplying operating fluid to said clutches (45, 46) and a lubricant passage (69) for supplying lubricant to said clutches (45, 46), a rotary joint (65) for connecting said fluid passage (61) to a stationary fluid passage (67) being formed within said second bearing support wall (4) and another rotary joint (70) for connecting said lubricant passage (69) to a stationary lubricant passage (73) being formed within said first bearing support wall (1a).

4. The transmission system as set forth in claim 3, wherein one of said clutches (45) is formed into a fluid-actuated frictional clutch having a first set of frictional elements (47, 48), a first piston (49) for engaging between said first set of frictional elements under the action of fluid pressure, and a return spring (50) for biasing said first piston to move away from said first set of frictional elements so as to disengage between said first set of frictional elements, whereas the other of said clutches (46) is formed into a spring-actuated frictional clutch having a second set of frictional elements (52, 53), a spring (56) for engaging between said second set of frictional elements, and a second piston (59) for disactuating said spring under the action fluid pressure so as to disengage between said second set of frictional elements, said at least one fluid passage (61) in said transmission shaft (11) being composed of a single fluid passage through which fluid pressure is selectively supplied to and drained from said first and second pistons (49), 59) for performing the speed change transmission by said second supplementary speed change mechanism (14).

5. The transmission system as set forth in claim 4, wherein a clutch cylinder (44) having a partition (44a) at an axially middle portion, thereof is fixedly mounted on said transmission shaft (11), wherein said one clutch (45) is disposed within in one axial half of said clutch cylinder (44) with said first piston (49) being disposed adjacent to said partition (44a), and wherein said the other clutch (46) is disposed within the other axial half of said clutch cylinder (44) with said second set of frictional elements (52, 53) being disposed adjacent to said partition (44a), said spring (56) being disposed such that it acts upon said second set of frictional elements through a push disk (54) which is slidably but non-rotatably supported by said clutch cylinder, said clutch cylinder (44) having an integral cylinder portion (58) at an outer circumference of said partition (44a) for receiving said second piston (59) such that said second piston abuts at an extension (59a) thereof against said push disk (54).

6. The transmission system as set forth in claim 5, wherein said clutch cylinder (44) includes a fluid passage (62) for connecting said fluid passage (61) in said transmission shaft (11) to a fluid chamber (51) which is formed between said first piston (49) and said partition (44a), and another fluid passage (63) for connecting said fluid chamber (51) to a fluid chamber (60) in said cylinder portion (58).

7. The transmission system as set forth in claim 5, wherein said first piston (49) and said second piston (59) are partially overlapped in an axial direction of said clutch cylinder (44).

* * * * *